United States Patent [19]
Widemann et al.

[11] Patent Number: 5,566,222
[45] Date of Patent: Oct. 15, 1996

[54] METHOD OF AND APPARATUS FOR EXPOSING DATA ON X-RAY FILMS

[75] Inventors: Ernst Widemann, Hebertshausen; Hans Schaller, Rain/Lech, both of Germany

[73] Assignee: AGFA-Gevaert AG - Fototechnik, München, Germany

[21] Appl. No.: 246,104

[22] Filed: May 19, 1994

[30] Foreign Application Priority Data

Jun. 7, 1993 [DE] Germany ............... 43 18 899.0

[51] Int. Cl.⁶ .................................... G03B 42/04
[52] U.S. Cl. ............................ 378/166; 378/165
[58] Field of Search ..................... 378/161, 162, 378/165, 166; 354/105, 106

[56] References Cited

U.S. PATENT DOCUMENTS

| | | | |
|---|---|---|---|
| 4,731,624 | 3/1988 | Nagata et al. | 354/64 |
| 4,810,623 | 3/1989 | Kokelenberg et al. | 430/448 |
| 4,860,330 | 8/1989 | Strömmer et al. | 378/162 |
| 4,918,497 | 4/1990 | Edmond | 357/17 |
| 5,288,977 | 2/1994 | Amendolia et al. | 235/375 |

FOREIGN PATENT DOCUMENTS

| | | |
|---|---|---|
| 0238464 | 3/1987 | European Pat. Off. |
| 0256535 | 8/1987 | European Pat. Off. |
| 3321653 | 12/1983 | Germany. |
| 3425761 | 2/1985 | Germany. |
| 3633289 | 3/1988 | Germany. |
| 4140718A1 | 12/1991 | Germany. |
| 61-170740 | 8/1986 | Japan. |
| 2027496 | 1/1990 | Japan. |
| 8906377 | 7/1989 | WIPO. |
| WO9007196 | 6/1990 | WIPO. |

*Primary Examiner*—David P. Porta
*Assistant Examiner*—David Vernon Bruce
*Attorney, Agent, or Firm*—Darby & Darby, P.C.

[57] ABSTRACT

A cassette containing an x-ray film with a latent image is placed in a camera having a memory which receives data relating to the image. The cassette is provided with a window which is closed by a cover and, once the cassette is in the camera, the window is sealed from external light. A moving mechanism then slides away the cover to open the window. The moving mechanism carries a printed circuit board which supports the memory, two parallel rows of LEDs and a microprocessor connected to the memory and the LEDs. The rows extend perpendicular to the direction of movement of the moving mechanism, and the LEDs of the rows are offset relative to one another. After the window has been opened completely, the moving mechanism begins to close the window. As the window closes, the microprocessor activates the LEDs so that the latter print the data in the memory on the portion of the film in the window. The LEDs emit light which has an intensity maximum in the wavelength range of 400 nm to 510 nm and is thus capable of exposing x-ray film sensitive to green light as well as x-ray film sensitive to blue light.

13 Claims, 5 Drawing Sheets

METHOD OF AND APPARATUS FOR EXPOSING DATA ON X-RAY FILMS

FIELD OF THE INVENTION

The invention relates to the printing of data on film.

BACKGROUND OF THE INVENTION

X-ray films are widely used for non-destructive testing of materials and for medical diagnosis. In addition to the x-ray image, it is frequently necessary to provide a film with data specific to the image. Examples of such data are the date of exposure, the name of the technician, the type of film, the tube voltage and a description of the x-rayed object. For medical purposes, data relating to the patient are also required, e.g., name, birth date and insurance. Currently, patient data are listed on a printed or typewritten card which is prepared for the patient and imaged onto the film. However, since the data are often fed into a central processor where they are available in digital form, it would be desirable to print the data directly on the film.

Frequently, the patient data are fed into the central processor by means of a terminal (a keyboard or PC) or are read into the central processor from a patient data card (C2 card) via a magnetic card reader or bar code reader. The digitized data can then be centrally processed in a patient data system and transferred to other apparatus.

A system for printing data on x-ray film is known from the International publication WO 89/06377. In this system, patient data are printed directly on an x-ray film by means of LEDs in an x-ray photography unit. The film is accommodated in an x-ray film cassette having an exposure window through which the patient data are printed on the film. The LEDs, which are arranged in a row, are moved past the exposure window in a direction transverse to the row. The data are printed on the film in the form of alphanumeric symbols by activating the individual LEDs sequentially or simultaneously. Each symbol is here constituted by a multiplicity of printed data points.

The system disclosed in the International publication WO 89/06377 is suitable for mammographic film. However, it cannot be employed for all types of film and all applications.

SUMMARY OF THE INVENTION

It is an object of the invention to provide a method which allows data to be printed on photographic material relatively economically.

Another object of the invention is to provide a method of printing data on photographic material which can be used in many areas of x-ray technology.

An additional object of the invention is to provide an apparatus which enables data to be printed on photographic material relatively inexpensively.

A further object of the invention is to provide an apparatus which can be employed in many areas of x-ray technology to print data on photographic material.

The preceding objects, as well as others which will become apparent as the description proceeds, are achieved by the invention.

One aspect of the invention resides in a method of inserting data on photographic material, especially x-ray film. The method comprises the steps of providing an article of photographic material which is sensitive to green or blue light, and printing at least one indicia on the photographic article. The printing step includes exposing the article to printing light having an intensity maximum in the wavelength range of about 400 nm to about 510 nm.

It is preferred for the printing step to be controlled on the basis of digital data representing the indicia.

The printing step can be performed using a row of LEDs. In such an event, the printing step may include moving the LED row and the photographic article relative to one another along a direction transverse to the row, and sequentially exciting the LEDs. In one embodiment of the method, the row of LEDs and the photographic article are moved relative to each other along a direction which is inclined to the row.

The photographic article can be stationary during the printing step and the LEDs moved past the article. Alternatively, the LEDs can be held stationary during the printing step, e.g., by fixing the LEDs on an x-ray processing unit, and the article transported past the LEDs.

The indicia may be constituted by a plurality of exposed points of the photographic article. The printing step may then involve forming the indicia point-by-point.

Each point of the indicia has a maximum possible density and the printing step preferably comprises regulating the printing light so that the points achieve at least 60 percent of their maximum possible densities. Such regulation can be important, for example, when the printing light is blue and the photographic article is sensitive to green light.

The printing light can be in the form of light pulses which impinge on the photographic article at respective locations. Each of the points of the indicia can then be produced from two or more light pulses whose impingement locations overlap.

The step of providing the photographic article may involve placing the article in an enclosure, e.g., an x-ray film cassette, having a closed exposure window. In this case, the method further comprises the step of fully opening the window before carrying out the printing step. The method can additionally include the step of closing the window and the printing step is here preferably carried out during the closing step.

Another aspect of the invention resides in an apparatus for inserting data on photographic material. The apparatus comprises guiding means for a photographic article, and means for printing an indicia on the article. The printing means includes a light source which emits printing light having an intensity maximum in the wavelength range of about 400 nm to about 510 nm.

The printing means is preferably designed to print the indicia point-by-point.

The light source may include a row of LEDs and the apparatus can then further comprise means for moving the photographic article and the LED row relative to one another along a direction transverse to the row. The printing means may here include means for exciting the LEDs sequentially.

The method and apparatus of the invention are particularly well-suited for printing data on x-ray film.

The invention takes cognizance of the fact that different types of x-ray film are used in different applications and that each type of film is most sensitive to light of a different wavelength. Two different types of x-ray film are widely employed. One is the so-called panchromatic film, such as Agfa's Curix RP1, which is especially sensitive to blue light. The other is the so-called ortho film, typified by Agfa's Curix Ortho HT-U, which is particularly sensitive to green light. It has now been found that film sensitive to green light and film sensitive to blue light can be darkened to approximately the same degree by a light source, e.g., a row of LEDs, which emit in the wavelength range of about 400 nm to about 510 nm. Accordingly, the method and apparatus of the invention provide the advantage that x-ray films from different fields can be safely and reliably printed with data using one and the same light source.

BRIEF DESCRIPTION OF THE DRAWINGS

Additional features and advantages of the invention will be forthcoming from the following detailed description of preferred embodiments when read in conjunction with the accompanying drawings. In the drawings.

DESCRIPTION OF PREFERRED EMBODIMENTS

Figure 1:
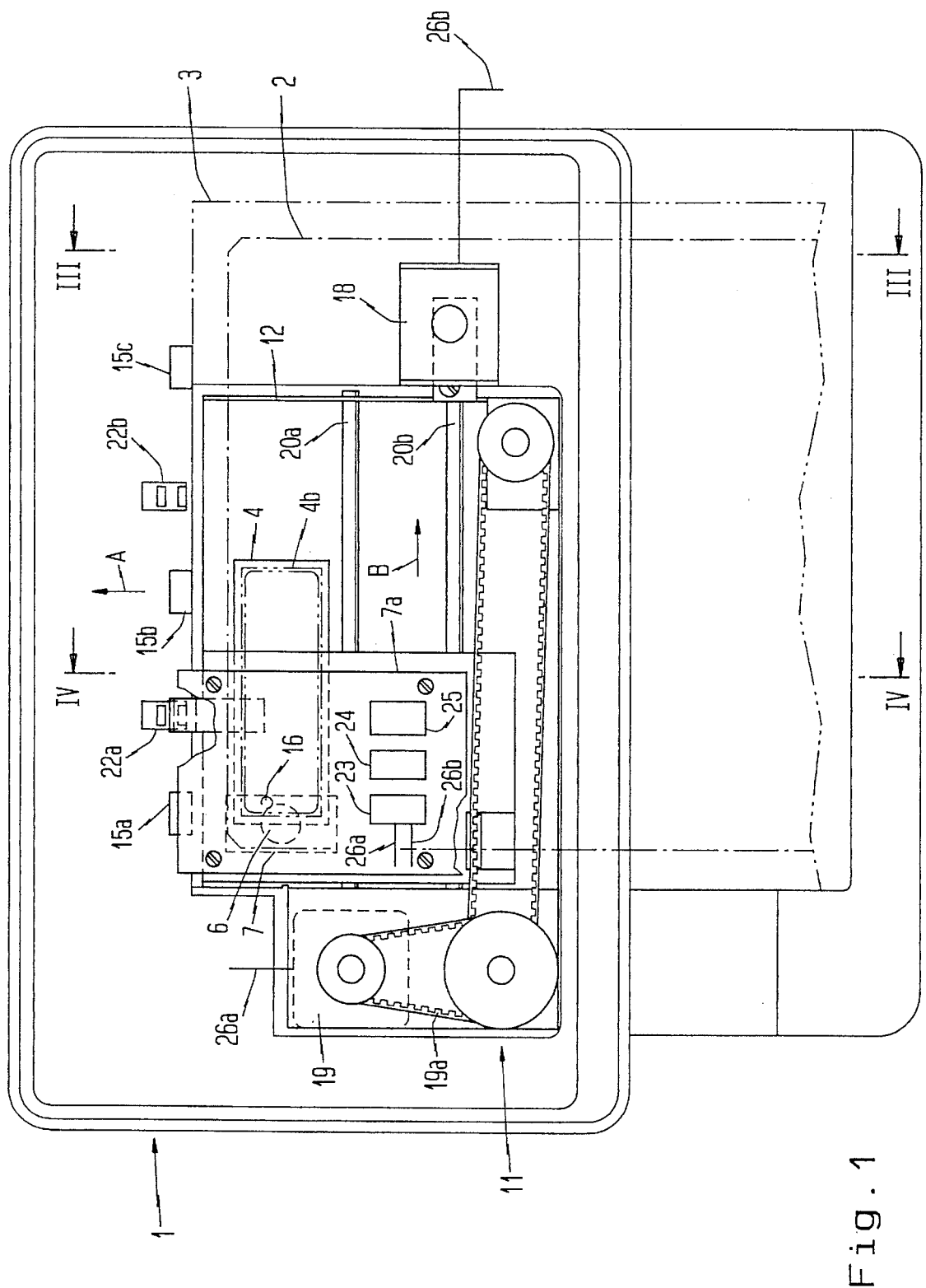
FIG. 1 is a plan view of a camera according to the invention for printing data on x-ray film, the camera being in a first condition.

Considering first FIG. 1 of the drawings, the reference numeral 1 identifies a camera for printing data on x-ray film. The camera 1 is provided with guiding means for an x-ray film cassette 3 which accommodates a sheet of x-ray film 2. The cassette 3 has an exposure window 4 through which data can be printed on the film 2. The exposure window 4 is closed by a lightproof cover 4b which is slidable in a direction B to open the exposure window 4 and in an opposite direction B', illustrated in FIG. 2, to close the window 4.

Sensors 15a, 15b, 15c assure that the cassette 3 rests in the camera 1 in a specific position. This position is one in which the exposure window 4 is located in the region of the sensors 15a, 15b, 15c. The sensors 15a, 15b, 15c generate error signals when the cassette 3 is inserted in the camera 1 in the wrong orientation, e.g., when the cassette 3 is placed in the camera 1 in a position rotated 90 degrees from the position of FIG. 1 in the plane of FIG. 1 so that the exposure window 4 is not located in the region of the sensors 15a, 15b, 15c but, rather, at the right edge of the camera 1.

Figure 5:
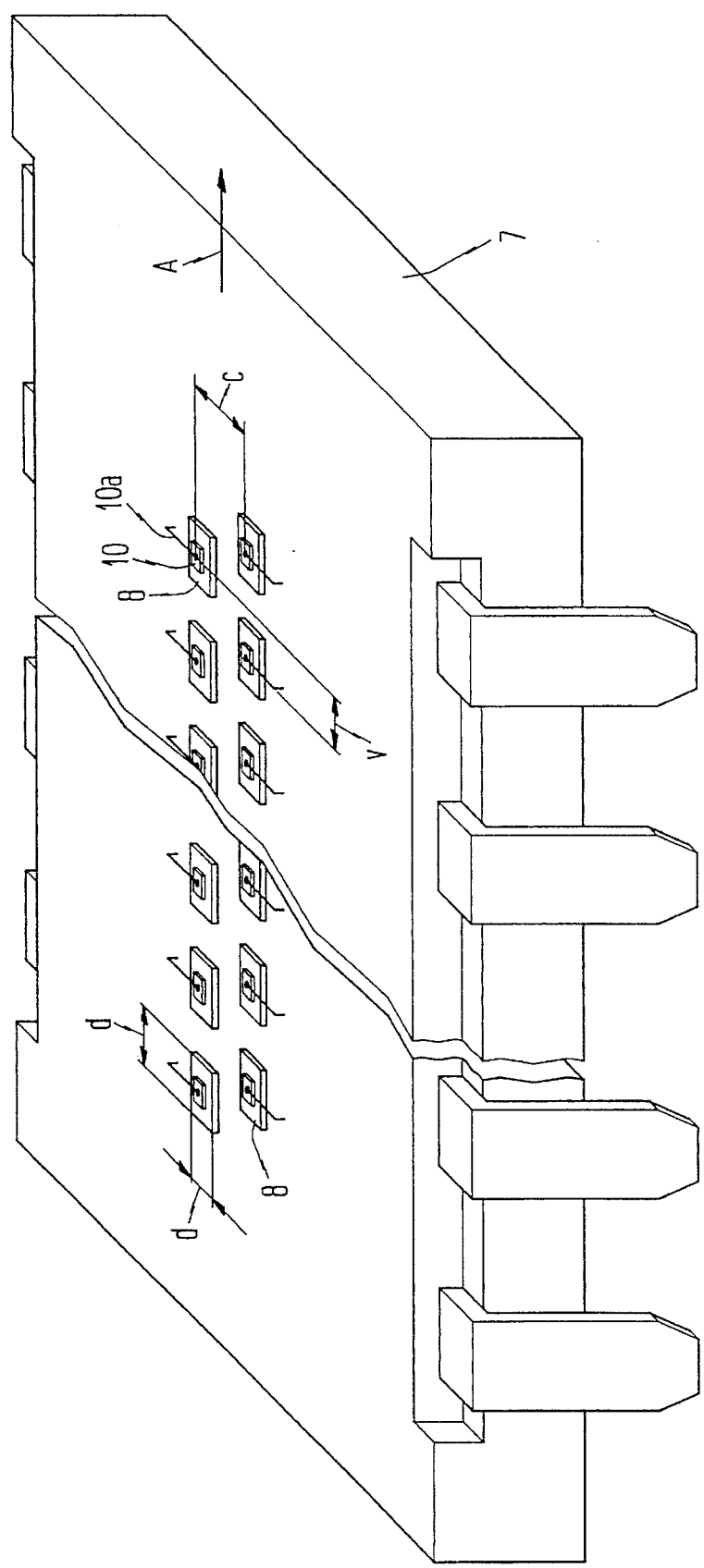
FIG. 5 is a perspective view of a chip forming part of the camera.

A diode chip 7 is located in the camera 1 and, as shown in FIG. 5, carries two parallel rows of LEDs 8 on one surface thereof. This is the bottom surface of the chip 7 in FIG. 1. The rows of LEDs 8 extend in a direction A perpendicular to the directions B and B'. The LEDs 8 constitute a source of printing light for printing data on the film 2.

Optical means 6 serves to direct the printing light from the LEDs 8 to the film 2 and can also function to focus the printing light on the film 2. The optical means 6 can include an objective or optical fibers.

A mechanism for opening and closing the exposure window 4 is identified generally by the reference numeral 11. The opening and closing mechanism 11 includes a releasing pin 16, a holder 17, a displacing magnet 18, a motor 19, a belt drive 19a and guide rods 20a, 20b. The guide rods 20a, 20b are fixed to a carrier plate 12 and the holder 17 is shiftable along the guide rods 20a, 20b via the motor 19 and the belt drive 19a. The guide rods 20a, 20b extend parallel to the directions B and B' so that the holder 17 moves normal to the direction of elongation A of the LED rows.

Figure 3:
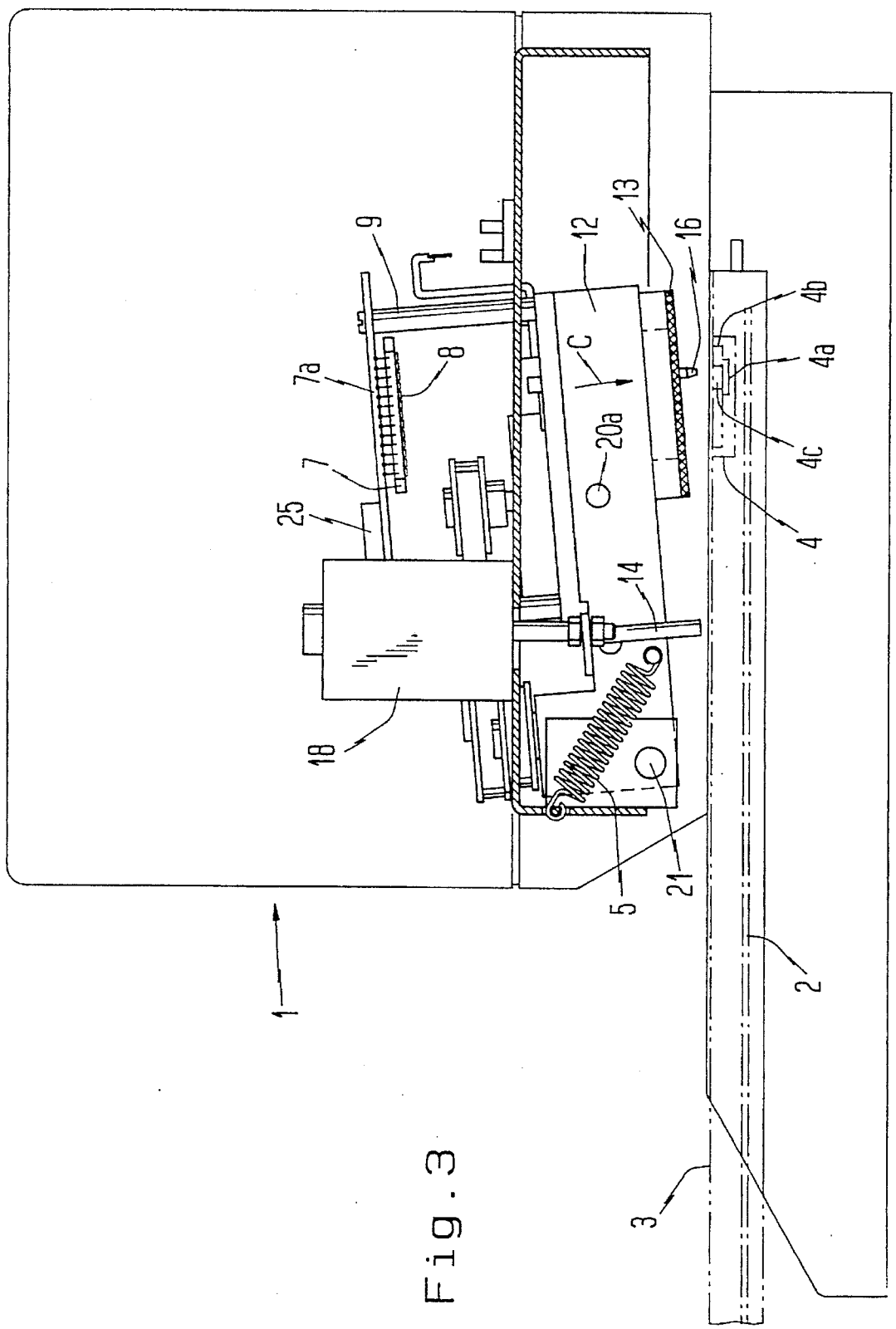
FIG. 3 is a section as seen in the direction of the arrows III—III of FIG. 1.
Figure 4:
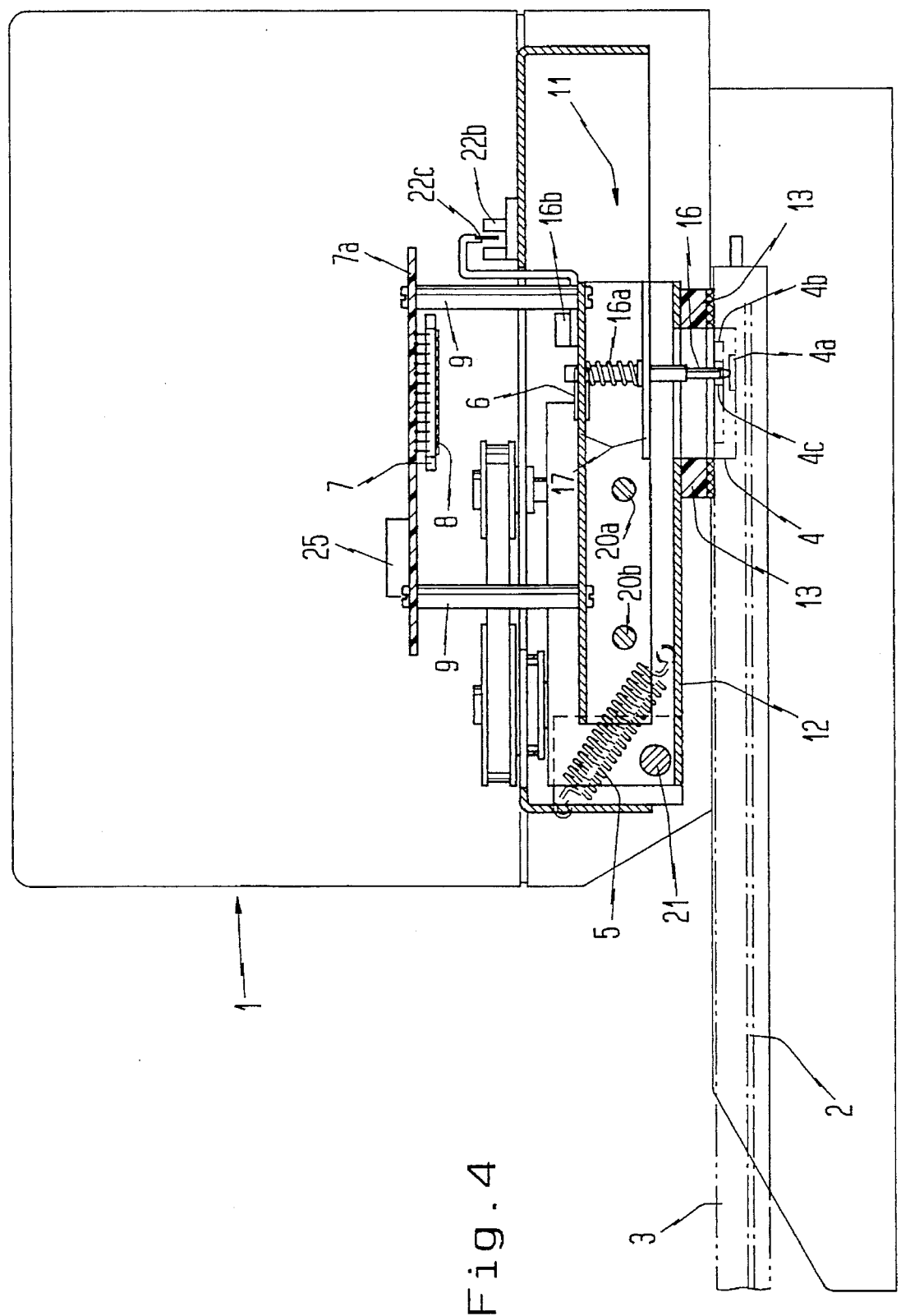
FIG. 4 is a section as seen in the direction of the arrows IV—IV of FIG. 1.

The diode chip 7 is arranged on a printed circuit board 7a which additionally supports a set 23 of other electronic components including a microprocessor. A digital interface 24 and a memory 25 are further mounted on the printed circuit board a and are conductively connected to the components 23. The digital interface 24 can, for example, be an RS232 interface. However, it is also possible for the interface to be a parallel interface. The printed circuit board 7a is fixed to the holder 17 by spacer bolts 9 as best seen in FIGS. 3 and 4 so that the printed conductor plate 7a can move along the guide rods 20a, 20b together with the holder 17.

The diode chip 7 is conductively connected to the electronic components 23 through the printed circuit board 7a. The electronic components 23 can exchange data with remote installations or data storage devices via the interface 24. Data transmitted to the data camera 1 by means of the interface 24 are stored in the memory 25. The memory 25 retains this data until all of it has been printed on the x-ray film 2. The electronic components 23 monitor the data transfer and insure that all data is transmitted correctly. The electronic components 23 also control the motor 19 via conductors 26a, 26b.

As will be described, the camera 1 is provided with sensors other than the sensors 15a, 15b, 15c. The electronic components 23 are conductively connected with all of the sensors of the camera 1.

Figure 2:
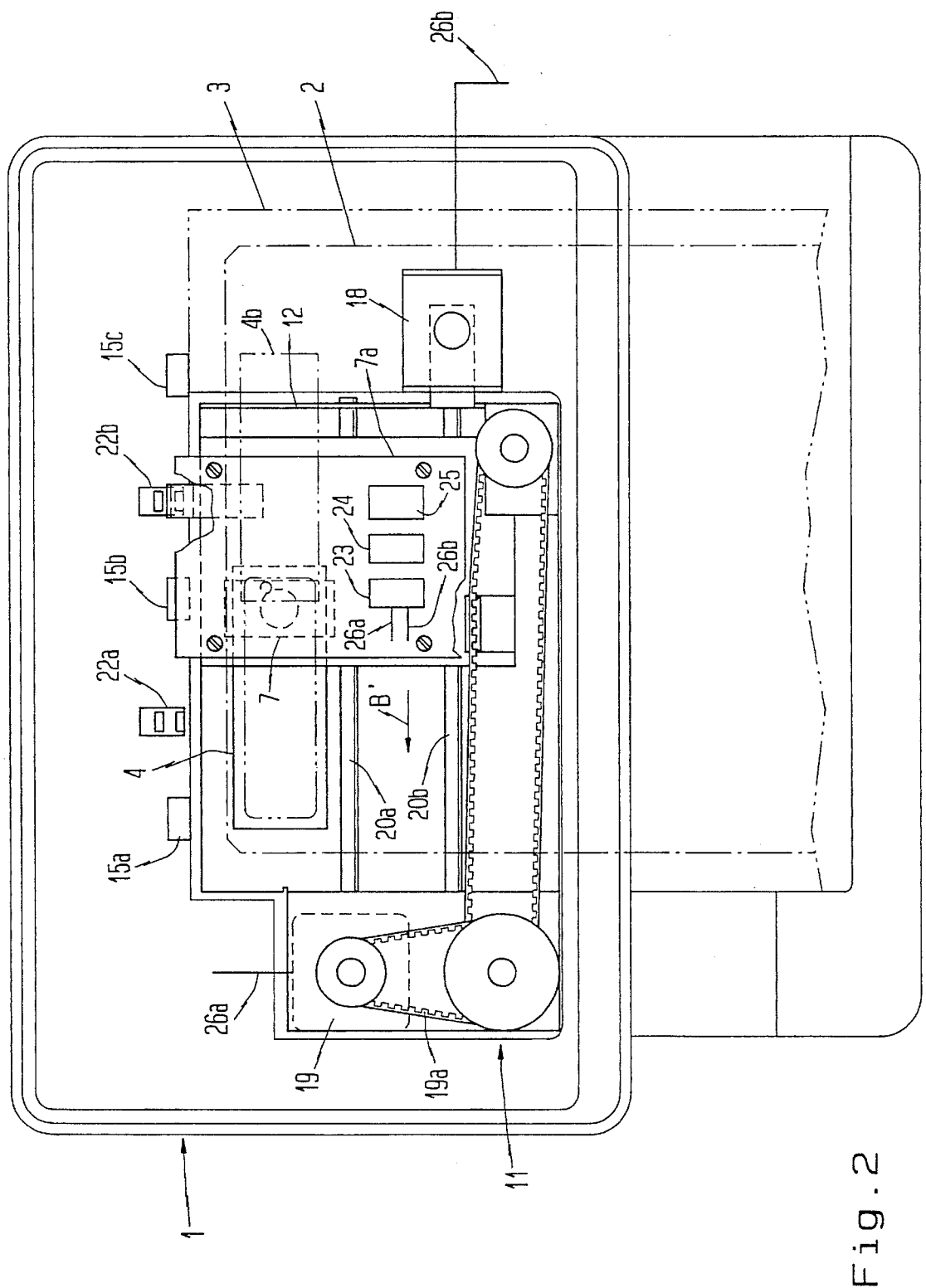
FIG. 2 is similar to FIG. 1 but shows the camera in a second condition.

FIG. 1 shows the position of the opening and closing mechanism 11 when the exposure window 4 is closed by the cover 4b. On the other hand, FIG. 2 illustrates the position of the opening and closing mechanism 11 when the exposure window 4 is open. In FIG. 2, the cover 4b has been shifted to the right away from the window 4.

Two sensors 22a and 22b in the form of light barriers are spaced from one another along the directions B,B' and are designed to detect an arm 22c carried by the holder 17. The light barriers 22a and 22b are arranged in such a manner that the arm 22c activates the light barrier 22a when the exposure window 4 is fully closed and the light barrier 22b when the exposure window 4 is completely open.

FIGS. 3 and 4 show that the carrier plate 12 is pivotable on a pivot 21 which is fixed to the camera 1. A spring 5 acts on the carrier plate 12 and the displacing magnet 18 is arranged to swing the carrier plate downward in direction C against the force of the spring 5. When the cassette 3 is out of the camera 1, the carrier plate 12 is in the raised position illustrated in FIG. 3. Following proper insertion of the cassette in the camera 1, the carrier plate 12 is urged to the lowered position of FIG. 4 by the displacing magnet 18.

A light seal 13 provided with a felt overlay is mounted on the bottom of the carrier plate 12. In the lowered position of the carrier plate 12, the seal 13 circumscribes the exposure window 4 and seals it against light.

An abutment 14 limits the downward movement of the carrier plate 12. When the optical means 6 includes an objective, the abutment 14 insures that an appropriate spacing exists between the focal plane of the objective and the plane of the film 2. The height of the abutment 14 is variable so that adjustments can be made for different film positions.

The cassette 3 is provided with a rocker 4a which serves to lock the cover 4b in the closed position. The rocker 4a, which is resiliently biased in a sense to lock the cover 4b in the closed position, is accessible from above in FIGS. 3 and 4 via a releasing opening 4c in the cassette 3. Upon movement of the carrier plate 12 to its lowered position, the releasing pin 16 enters the releasing opening 4c and presses on the rocker 4a thereby causing the latter to release the cover 4b. The cover 4b can now be shifted away from the exposure window 4 to open the same.

As best seen in FIG. 4, the releasing pin 16 is subjected to the action of a spring 16a which reacts against the holder 17. A sensor 16b in the form of a light barrier senses the position of the releasing pin 16.

As mentioned previously, FIG. 5 shows that the diode chip 7 carries two parallel rows of LEDs 8 with the rows extending in the direction A. By way of example, the diode chip 7 can be of the type manufactured by ELCOS GmbH, D-85276 Pfaffenhofen, Federal Republic of Germany while the LEDs 8 can be of the type C470-5D. The LED rows are spaced from one another by a distance "c" and each of the LEDs 8 has a width "d". The LED rows are offset relative to one another along the direction A by a distance "v" smaller than the width "d". As indicated earlier, the LEDs 8 constitute a source of printing light for printing data on the film 2. The LEDs 8 are designed to print a symbol or indicia representative of data on the film 2 point-by-point and the offset "v" of the LED rows allows a high resolution of the data points to be achieved during exposure of the film 2.

The center of each LED 8 is provided with a bond pad 10 which is contacted by a bond wire 10a. The bond wires 10a establish conductive connections with the diode chip 7.

The LEDs 8 emit light having an intensity maximum in the wavelength range of 400 nm to 510 nm. For instance, the LEDs 8 can emit blue light having an emission maximum at a wavelength of 470 nm and a spectral half width of 70 nm.

As an example, each LED row can contain forty LEDs 8 having square emission surfaces per the showing in FIG. 5. The width "d" of an LED 8 can be 0.33 mm, the spacing "c" between the LED rows can be 1.2 mm and the offset "v" of the LED rows can be 0.3 mm.

The procedure for printing data on the x-ray film 2 is as follows:

The film 2 is placed in the x-ray film cassette 3 and the cassette 3 inserted in the data camera 1. The orientation of the cassette 3 in the camera 1 is detected by the sensors 15a, 15b, 15c. When the cassette 3 is properly positioned in the camera 1, all of the data to be printed on the film 2 is read into the memory 25 via the interface 24.

The carrier plate 12 is now pivoted downward by the displacing magnet 18 so that it presses against the cassette 3. As the carrier plate 12 moves down, the releasing pin 16 pushes down the rocker 4a against the action of the resilient force which causes the rocker 4a to hold the cover 4b in its closed position. The cover 4b is thus released. The arrangement is such that the releasing pin 16 moves the rocker 4a down through a predetermined distance with a predetermined force, e.g., a force of 8N. The downward motion of the releasing pin 16 is monitored by the light barrier 16b. In the event that the releasing pin 16 does not move down sufficiently far, the light barrier 16b causes the error message "releasing pin too high" to be generated.

Aside from release of the cover 4b, the downward movement of the carrier plate 12 causes the light seal 13 to be pressed against the cassette 3 around the entire periphery of the exposure window 4. The exposure window 4 is thereby sealed from external light.

Once the exposure window 4 has been sealed, the holder 17 is shifted in the direction B by means of the motor 19 and the belt drive 19a. The releasing pin 16, which holds down the rocker 4a, pulls along the cover 4b in the direction B thus opening the exposure window 4. The motor 19 exerts a predetermined opening force, e.g., 7N, on the cover 4b.

When the arm 22c reaches the light barrier 22b, the exposure window 4 is completely open and the light barrier 22b sends a signal indicative of the message "window open" to the electronic components 23. Should the exposure window 4 fail to reach the fully open position within a specified time interval, the electronic components 23 generate the error message "window not opened".

The printing of data on the film 2 begins only after the exposure window 4 has been completely opened. In order to print data on the film 2, the holder 17 with the diode chip 7 is moved past the exposure window 4 in the direction B'. The data are printed point-by-point meaning that each symbol or indicia printed on the film 2 is made up of many data points. Each data point thus has an area substantially smaller than that of the associated symbol or indicia.

Printing of a data point is accomplished by pulsing the LEDs 8 using a multiplexing procedure. Each data point is generated by individually exposing overlapping locations of the film 2. This enables a data point to be darkened over its entire area even though the LEDs 8 emit no light in the regions of the bond pads 10 and the bond wires 10a. To obtain a uniform size for the data points, exposure is begun only after the holder 17 has reached its final speed.

When using LEDs 8 which emit blue light and a film 2 which is sensitive to green light, the amount of light used to produce each data point is selected so that the film 2 achieves at least 60 percent of its maximum density at the respective data points.

Due to differing European and U.S. standards, the exposure window 4 can have different sizes. Adjustment of the size of the symbols or indicia representing the data being printed to the size of the exposure window 4 can be readily achieved by appropriate regulation of the LEDs 8. Suitable sets of symbols or indicia can be easily programmed. Inversion of the data is also easily accomplished.

Following printing of the data on the film 2, the exposure window 4 is once again closed. Advantageously, printing of the data takes place simultaneously with the closing of the exposure window 4. The closing forces are not limited to insure that printing and simultaneous closing of the window 4 proceed reliably.

Closing of the exposure window 4 is complete when the arm 22c reaches the light barrier 22a. Once the exposure window 4 has been closed, the carrier plate 12 is pivoted upward by the spring 5 thereby releasing the cassette 3 for removal of the latter from the camera 1.

The invention is not limited to the exemplary embodiment described above. Numerous modifications employing the concepts of the invention are possible. By way of example, a row of LEDs 8 can be moved past the film 2 along a direction which is inclined to the row rather than being perpendicular to the row. The same resolution can then be obtained with a single row of LEDs 8 as with two relatively offset rows. However, the activation of the LEDs 8 over time must then be adjusted to the new conditions.

The diode chip 7 with the LEDs 8 can be integrated in conventional installations. For instance, the diode chip 7 with the LEDs 8 can be integrated in a photographic system, or an apparatus in which x=ray films are processed, e.g., an apparatus for loading and unloading x-ray film cassettes, or in an apparatus for developing x-ray film. Since the film in such installations is moved anyway, it is possible to fix the diode chip 7 and nevertheless print data on the film pointby-point and line-by-line. Here, it is not necessary to open and close the exposure window 4 of an x-ray film cassette 3.

The data can also be transferred from a semiconductor memory on an x-ray film cassette 3 to a patient data system or vice versa. The process of writing to the memory preferably takes place simultaneously with the taking of an x-ray picture because this reduces the danger of entering the wrong data in the memory. Upon further processing of the film, the data can then easily be printed on the film in a handling or developing apparatus using an exposure device in accordance with the invention.

Although the invention has been described with reference to only a few exemplary embodiments, numerous other embodiments of the invention not mentioned here exist. Thus, various modifications can be made within the meaning and range of equivalence of the appended claims.

We claim:

1. A method of inserting data on photographic material, comprising the steps of providing a first article of photographic material which is sensitive to blue light; printing at least one indicia on said first article, the printing step including exposing said first article to printing light having an intensity maximum in the wavelength range of about 400 nm to about 510 nm only; providing a second article of photographic material which is of a different type than said first article and is sensitive to green light; and printing at least one indicia on said second article, the printing step including exposing said second article to printing light having an intensity maximum in the wavelength range of about 400 nm to about 510 nm only.

2. The method of claim 1, wherein said articles comprise x-ray film.

3. The method of claim 1, wherein at least one of the printing steps is performed using a row of LEDs, said one printing step including moving said row and the respective article relative to one another along a direction transverse to said row and sequentially exciting said LEDs.

4. The method of claim 3, wherein said direction is inclined to said row.

5. The method of claim 1, wherein a selected one of said indicia comprises a plurality of points and the respective printing step includes forming said selected indicia point-by-point.

6. The method of claim 5, wherein a selected one of said points has a maximum possible density and the respective printing step comprises regulating the respective printing light so that said point achieves at least 60 percent of said maximum possible density.

7. The method of claim 6, wherein said selected indicia is printed on said second article.

8. The method of claim 1, wherein the printing light for at least one of the printing steps is constituted by a plurality of light pulses which impinge on the respective article at respective locations, at least two of said locations overlapping.

9. The method of claim 1, wherein at least one of the printing steps is controlled on the basis of digital data.

10. The method of claim 1, wherein at least one of the printing steps is performed using a stationary light source and includes moving the respective article past said source.

11. A method of inserting data on photographic material, comprising the steps of providing an article of photographic material which is sensitive to green or blue light, the providing step including placing said article in an enclosure having a closed exposure window; fully opening said window; and printing at least one indicia on said article, the printing step being performed upon completion of the opening step and including exposing said article to printing light having an intensity maximum in the wavelength range of about 400 nm to about 510 nm.

12. The method of claim 11, further comprising the step of closing said window, the printing step being performed substantially simultaneously with the closing step.

13. An apparatus for inserting data on photographic material, particularly x-ray film comprising guiding means for a photographic article; means for printing an indicia on the article, said printing means including a light source which emits printing light having an intensity maximum in the wavelength range of about 400 nm to about 510 nm; and means for opening and closing an exposure window of a film cassette, said light source being fixed to said opening and closing means.

* * * * *

UNITED STATES PATENT AND TRADEMARK OFFICE
CERTIFICATE OF CORRECTION

PATENT NO. : 5,566,222
DATED : October 15, 1996
INVENTOR(S) : Ernst WIDEMANN and Hans SCHALLER

It is certified that error appears in the above-indentified patent and that said Letters Patent is hereby corrected as shown below:

On the title page: [30], Foreign Application Priority Data, change "43 18 899.0" to --P 43 18 899.0--.

Signed and Sealed this

First Day of April, 1997

BRUCE LEHMAN

*Attest:*

*Attesting Officer*    Commissioner of Patents and Trademarks